(12) United States Patent
Wang

(10) Patent No.: US 12,367,564 B2
(45) Date of Patent: Jul. 22, 2025

(54) IMAGE PROCESSING METHOD, DEVICE, AND MEDIUM

(71) Applicant: BEIJING ZITIAO NETWORK TECHNOLOGY CO., LTD., Beijing (CN)

(72) Inventor: Guangwei Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/005,926

(22) PCT Filed: Nov. 4, 2022

(86) PCT No.: PCT/CN2022/130049
§ 371 (c)(1),
(2) Date: Jan. 18, 2023

(87) PCT Pub. No.: WO2024/036764
PCT Pub. Date: Feb. 22, 2024

(65) Prior Publication Data
US 2024/0249399 A1    Jul. 25, 2024

(30) Foreign Application Priority Data
Aug. 17, 2022  (CN) .................. 202210986783.X

(51) Int. Cl.
*G09G 5/00*  (2006.01)
*G06T 3/40*  (2006.01)
(Continued)

(52) U.S. Cl.
CPC .............. *G06T 5/80* (2024.01); *G06T 3/40* (2013.01); *G06T 7/62* (2017.01); *G06T 7/74* (2017.01);
(Continued)

(58) Field of Classification Search
CPC ..... G06T 15/04; G06T 11/001; G06T 15/005; G06T 1/60; G06T 5/80; G06T 3/40;
(Continued)

(56) References Cited

U.S. PATENT DOCUMENTS 11,216,919 B2 * 1/2022 Jia ..................... H04N 23/698
2015/0016746 A1 * 1/2015 Tsubota .................. G06T 5/00
382/275
(Continued)

FOREIGN PATENT DOCUMENTS

CN       107424126 A       12/2017
CN       109214389 A       1/2019
(Continued)

OTHER PUBLICATIONS

Tan, et al. Enhanced vehicle 3D surround view based on corrdinate inverse mapping, Journal of Computer Application, 2021, 41(4): 1165-1171, English translation.
(Continued)

*Primary Examiner* — Gordon G Liu

(57) ABSTRACT

Some embodiments of the present disclosure relate to an image processing method, device, and a medium, wherein the method includes: acquiring an original image to be processed, wherein the original image comprises at least one of a panoramic image, a semi-panoramic image, or a fisheye image; in response to a target processing request for the original image, determining a target detection box in the original image; performing distortion correction processing on a first image corresponding to the target detection box in the original image to obtain a second image; and determining pixels to be processed in the first image based on the second image, and performing target processing on the pixels to be processed to obtain a target image.

13 Claims, 3 Drawing Sheets

(51) Int. Cl.
*G06T 5/80* (2024.01)
*G06T 7/00* (2017.01)
*G06T 7/62* (2017.01)
*G06T 7/73* (2017.01)
*G06V 10/40* (2022.01)

(52) U.S. Cl.
CPC ............ *G06T 7/97* (2017.01); *G06V 10/40* (2022.01); *G06T 2207/10016* (2013.01)

(58) Field of Classification Search
CPC .... G06T 7/62; G06T 7/74; G06T 7/97; G06T 2207/10016; G06T 7/73; G09G 5/363; G06V 10/49
USPC ........................................................ 345/582
See application file for complete search history.

(56) References Cited

U.S. PATENT DOCUMENTS

| | | | |
|---|---|---|---|
| 2020/0302188 | A1 | 9/2020 | Iwai |
| 2021/0134009 | A1 | 5/2021 | Zhang et al. |
| 2022/0057519 | A1* | 2/2022 | Goldstein ............... G01S 17/88 |
| 2022/0335703 | A1* | 10/2022 | Valluru ................... G06T 11/00 |

FOREIGN PATENT DOCUMENTS

| | | |
|---|---|---|
| CN | 107506693 B | 9/2019 |
| CN | 110197466 A | 9/2019 |
| CN | 110232667 A | 9/2019 |
| CN | 110675433 A | 1/2020 |
| CN | 110728622 A | 1/2020 |
| CN | 110971827 A | 4/2020 |
| CN | 111242881 A | 6/2020 |
| CN | 111667398 A | 9/2020 |
| CN | 112330576 A | 2/2021 |
| CN | 112712037 A | 4/2021 |
| CN | 113537207 A | 10/2021 |
| CN | 113610864 A | 11/2021 |
| CN | 113989259 A | 1/2022 |
| CN | 110971827 B | 2/2022 |
| CN | 114119410 A | 3/2022 |
| CN | 114445301 A | 5/2022 |
| CN | 114758027 A | 7/2022 |

OTHER PUBLICATIONS

Sanyuan, Face Attribute Classification Based On Deep Learning, A Master Thesis Submitted to University of Electronic Science and Technology of China, 2019 (74 pages).

Liu, et al., A detection and recognition system of pointer meters in substations based on computer vision, Measurement 152 (2020) 107333.

Extended EP Search Report issued Jun. 4, 2024 in EP Appl. No. 22838626.4 (6 pages).

* cited by examiner

IMAGE PROCESSING METHOD, DEVICE, AND MEDIUM

CROSS-REFERENCE TO RELATED APPLICATIONS

The present disclosure is a U.S. National Stage Application under 35 U.S.C. § 371 of International Patent Application No. PCT/CN2022/130049, filed on Nov. 4, 2022, which is based on and claims priority of Chinese application for invention No. 202210986783.X, filed on Aug. 17, 2022, the disclosure of both of which are hereby incorporated into this disclosure by reference in its entirety.

TECHNICAL FIELD

This disclosure relates to the technical field of image processing, and in particular, to an image processing method, apparatus, device, and medium.

BACKGROUND

With the continuous development of image processing technology, the application of a beautification function to a face or body part of a person in image/video shooting or live-streaming becomes more and more wide.

However, in an application of virtual reality (VR), a video or image is usually panoramic or semi-panoramic, so that distortion will occur for a person at an edge of the image, resulting in a poor beautification effect.

SUMMARY

In order to solve the above technical problem, the present disclosure provides an image processing method, apparatus, device, and medium.

Some embodiments of the present disclosure provide an image processing method, comprising:
acquiring an original image to be processed, wherein the original image comprises at least one of a panoramic image, a semi-panoramic image, or a fisheye image;
in response to a target processing request for the original image, determining a target detection box in the original image;
performing distortion correction processing on a first image corresponding to the target detection box in the original image to obtain a second image;
determining a pixels to be processed in the first image based on the second image;
and performing target processing on the pixels to be processed to obtain a target image.

Some embodiments of the present disclosure further provide an image processing apparatus, comprising:
an acquisition module configured to acquire an original image to be processed, wherein the original image comprises at least one of a panoramic image, a semi-panoramic image, or a fisheye image;
a detection box module configured to determine, in response to a target processing request for the original image, a target detection box in the original image;
a distortion correction module configured to perform distortion correction processing on a first image corresponding to the target detection box in the original image to obtain a second image; and
a processing module configured to determine pixels to be processed in the first image based on the second image, and perform target processing on the pixels to be processed to obtain a target image.

Some embodiments of the present disclosure further provide an electronic device, comprising: a processor; and a memory for storing executable instructions for the processor, wherein the processor is configured to read the executable instructions from the memory and execute the instructions to implement the image processing method according to some embodiments of the present disclosure.

Some embodiments of the present disclosure further provide a non-transitory computer-readable storage medium having thereon stored a computer program, for performing the image processing method according to some embodiments of the present disclosure.

BRIEF DESCRIPTION OF THE DRAWINGS

The above and other features, advantages, and aspects of some embodiments of the present disclosure will become more apparent in combination with the accompanying drawings and with reference to the following specific embodiments. Throughout the drawings, identical or similar reference numbers refer to identical or similar elements. It should be understood that the drawings are schematic and that components and elements are not necessarily drawn to scale.

DETAILED DESCRIPTION

Figure 1:
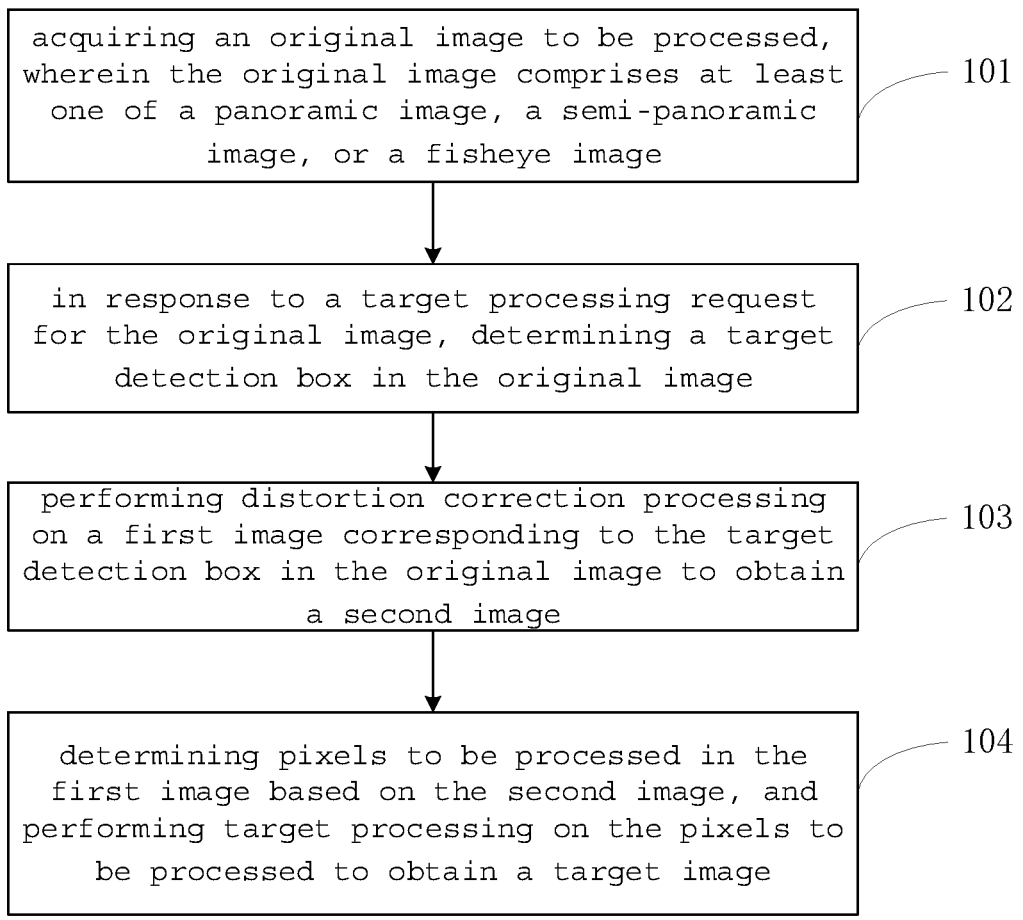
FIG. 1 is a schematic flow diagram of an image processing method according to some embodiments of the present disclosure.

Some embodiments of the present disclosure will be described in more detail below with reference to the accompanying drawings. While certain embodiments of the present disclosure are shown in the drawings, it should be understood that the present disclosure can be implemented in various forms and should not be construed as limited to some embodiments set forth herein. Instead, these embodiments are provided for a more complete and thorough understanding of the present disclosure. It should be understood that the drawings and the embodiments of the present disclosure are for exemplary purposes only and are not intended to limit the protection scope of the present disclosure.

It should be understood that steps recited in some method embodiments of the present disclosure can be performed in a different order, and/or performed in parallel. Moreover, the method embodiments can include an additional step and/or omit performing an illustrated step. The scope of the present disclosure is not limited in this respect.

The term "comprising" and its variants used herein are open-minded, i.e., "comprising but not limited to". The term "based on" is "based at least in part on". The term "one embodiment" means "at least one embodiment"; the term "another embodiment" means "at least one other embodiment"; the term "some embodiments" means "at least some embodiments". Related definitions for other terms will be given in the following description.

It should be noted that, the notions "first", "second", and the like mentioned in the present disclosure are only used for distinguishing different devices, modules, or units, and are not used for limiting order or interdependence of functions performed by the devices, modules, or units.

It should be noted that the modifications of "one", "more" mentioned in the present disclosure are intended to be illustrative rather than restrictive, and that those skilled in the art should appreciate that it should be understood as "one or more" unless otherwise clearly indicated in the context.

Names of messages or information interacted between a plurality of devices in some embodiments of the present disclosure are for illustrative purposes only, and are not intended to limit the scope of these messages or information.

In the related art, when beautification processing is performed on an image or video, key points of a part to be beautified is detected firstly, and then beautification special effect processing is performed according to the key points, however, when a person is at an edge of the image or video, distortion often occurs, resulting in invalidity of the key points or errors in an algorithm for the beautification special effect, thereby resulting in a poor effect of the beautification processing. In the related art, for a common image, the above problem can be solved by performing distortion correction processing on a local area to be processed in the image or video. However, for an image such as a panoramic or semi-panoramic image, an image after the distortion correction, after subjected to the beautification processing, must be re-distorted back, so that in this process, sampling many times for the image results in degraded definition of the image and low efficiency of the image processing, which is difficult to meet a real-time requirement of the image processing at high resolution.

In order to solve the above problem, some embodiments of the present disclosure provide an image processing method, which will be described below with reference to specific embodiments.

FIG. 1 is a flow diagram of an image processing method according to some embodiments of the present disclosure, the method can be performed by an image processing apparatus, wherein the apparatus can be implemented using software and/or hardware, and can be generally integrated in an electronic device. As shown in FIG. 1, the method comprises:

step 101, acquiring an original image to be processed, wherein the original image comprises at least one of a panoramic image, a semi-panoramic image, or a fisheye image.

The original image can be an image to be processed, wherein the original image can be a single image or an image frame in one video, and the original image can be an image with a large field angle. The original image in some embodiments of the present disclosure can comprise at least one of the panoramic image, the semi-panoramic image, the fisheye image, or the like, which is not specifically limited. The original image can comprise target objects, wherein the target objects can be main bodies for which image or video shooting is being performed, and the number and type of the target objects are not limited, for example, one of the target objects can be a person or an animal.

Specifically, the image processing apparatus can acquire the original image to be processed, and there is no limit on how the image is acquired, for example, it can be acquired by real-time shooting, or acquired from the Internet or locally.

Step 102, in response to a target processing request for the original image, determining a target detection box in the original image.

The target processing request can be a request of performing special processing on the image, and the special processing in some embodiments of the present disclosure is exemplified with beautification processing, which can comprise special processing on a face or body part of the object comprised in the image, such as beauty makeup, face sliming, and leg lengthening, which is not specifically limited.

The target detection box can be one rectangular box including a part to be subjected to target processing corresponding to the target processing request, i.e., a detection box including a part to be processed, for example, when the part to be processed is a face, the target detection box is a minimum enclosing rectangle of the face.

Specifically, the image processing apparatus can detect a trigger operation of a current user, and after detecting a preset trigger operation for the original image, can determine that the target processing request for the original image is received, wherein the preset trigger operation can comprise a gesture control operation (such as a click, a long press, a double click, and the like), a voice control operation, an expression control operation, and the like, for a control corresponding to the target processing request, which is not specifically limited. Then, a preset algorithm can be used to detect the original image in real time and extract a target detection box including the part to be processed, and the preset algorithm can be determined according to an actual situation, for example, the preset algorithm can include an aggregate channel feature (ACF) algorithm, etc., which is only an example.

Step 103, performing distortion correction processing on a first image corresponding to the target detection box in the original image to obtain a second image.

The first image can be one image in a small size that is extracted from the original image according to the target detection box, and the second image can be an image after the first image is subjected to the distortion correction processing. Distortion correction, also called counter-distortion, can be a process of correcting a phenomenon that distortion occurs at an edge of the image, and the corrected image can be regarded as an undistorted image.

In some embodiments, the performing distortion correction processing on a first image corresponding to the target detection box in the original image to obtain a second image can comprise: extracting the first image corresponding to the target detection box in the original image, and performing distortion correction processing on the first image by using a multithread processing tool to obtain the second image.

The multithreading processing tool can be a tool for performing distortion correction processing, processing efficiency can be improved through multithreading processing, and a specific multithreading processing tool can be determined according to an actual situation, for example, the multithreading processing tool can include a shader, a compute unified device architecture (CUDA), and the like.

In the above solution, only the area image of the target detection box is subjected to distortion correction processing through the multithread processing tool, which can effectively increase a processing speed of the algorithm and further improve efficiency of subsequent image processing.

Step 104, determining pixels to be processed in the first image based on the second image, and performing target processing on the pixels to be processed to obtain a target image.

The target processing can be certain special processing performed on the image, the target processing in some embodiments of the present disclosure is exemplified with beautification processing, and the beautification processing can comprise special processing on a face or body part of the object comprised in the image, such as beauty makeup, face sliming, and leg lengthening, which is not specifically limited. The target image can be an image after the original image is subjected to the target processing, for example, the target image can be an image after the original image is subjected to the beauty makeup processing.

Figure 2:
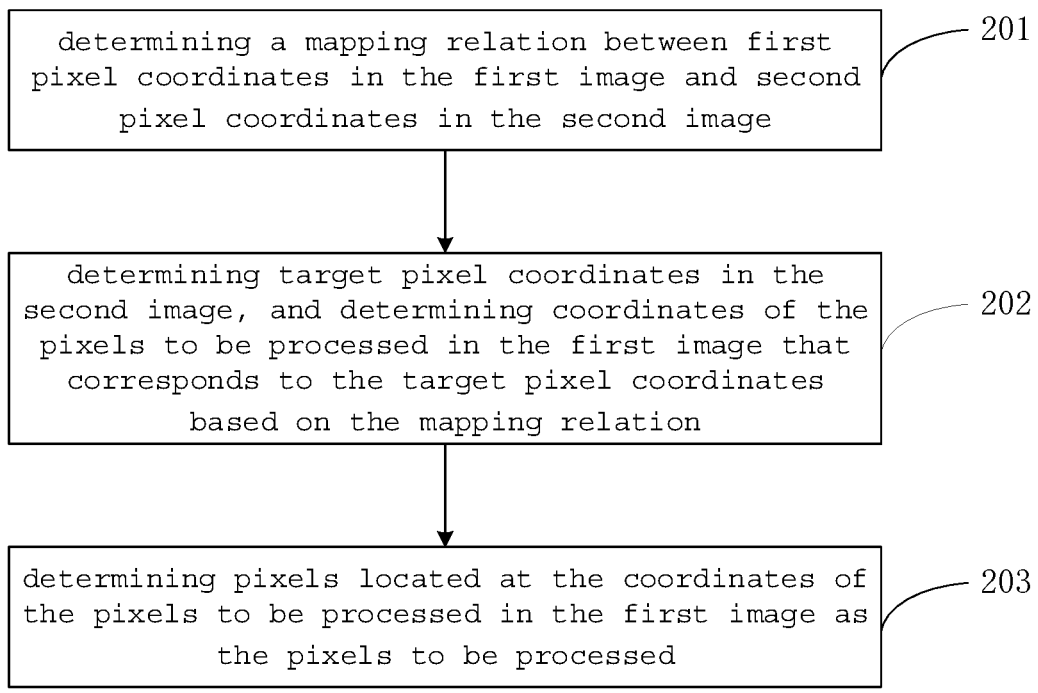
FIG. 2 is a schematic flow diagram of another image processing method according to some embodiments of the present disclosure.

Exemplarily, FIG. 2 is a schematic flow diagram of another image processing method according to some embodiments of the present disclosure, and as shown in FIG. 2, in some feasible embodiments, the determining pixels to be processed in the first image based on the second image can comprise:

step 201, determining a mapping relation between first pixel coordinates in the first image and second pixel coordinates in the second image.

The first image can comprise a plurality of first pixels, and coordinates of the first pixels in the first image are the first pixel coordinates; and the second image comprises a plurality of second pixels, and coordinates of the second pixels in the second image are the second pixel coordinates. The mapping relation can be a correspondence between two pixel coordinates characterizing one same spatial location point in the first image and the second image, which are respectively in the two images, that is, for each of the first pixel coordinates of each first image, a corresponding second pixel coordinate in the second image obtained after the distortion correction processing is determined, respectively, and in the mapping relation, each of the first pixel coordinates corresponds to one second pixel coordinate.

Since the distortion correction processing on the first image in the above step 102 is performed in pixel units, the image processing apparatus can, after the step 102, determine the mapping relation between the first pixel coordinates in the first image and the second pixel coordinates in the second image.

Step 202, determining target pixel coordinates in the second image, and determining coordinates of the pixels to be processed in the first image that corresponds to the target pixel coordinates based on the mapping relation.

The image processing apparatus can, after performing distortion correction processing on the first image corresponding to the target detection box in the original image to obtain the second image, perform key point detection on the second image to determine key point information, and then according to a location relation between key points in the key point information and the second pixel coordinates in the second image, can determine the target pixel coordinates to be subjected to the target processing, wherein a specific location relation is determined according to a part subjected to the target processing, a processing type, a processing range, and the like, for example, if target processing is to add false eyelashes, second pixel coordinates within a preset range near eyelash key points can be determined as target pixel coordinates that needs the false eyelashes to be added, which is only an example.

Then, the image processing apparatus can search in the mapping relation to determine first pixel coordinates corresponding to the target pixel coordinates, namely, to obtain the coordinates of the pixels to be processed.

Step 203, determining pixels located at the coordinates of the pixels to be processed in the first image as the pixels to be processed.

The pixels to be processed can be pixels in the first image that really needs to be subjected to the target processing in a subsequent process. The image processing apparatus can, after determining the coordinates of the pixels to be processed of the first image, determine the pixel located at the coordinates of the pixels to be processed as the pixels to be processed. Then, the pixels to be processed is subjected to the target processing, and a first image after the target processing is in place of the first image before the processing in the original image to obtain the target image.

In some embodiments, when the target processing is to add a special effect element, the performing target processing on the pixels to be processed to obtain a target image can comprise: adding attribute information of the special effect element to the pixels to be processed in the first image to obtain the target image.

The special effect element can be understood as an element for adding additional content to a certain part of the target object, for example, the special effect element can include false eyelashes, rouge, a hat, or the like, which is not specifically limited. The attribute information of the special effect element can be information characterizing an attribute such as texture or color of a surface of the special effect element.

When the target processing is to add the special effect element, the image processing apparatus can add the attribute information of the special effect element to the pixels to be processed in the first image, so that the adding of the special effect element to the pixels to be processed can be achieved to obtain the target image. For example, assuming that target processing is adding false eyelashes, pixel values of texture of the false eyelashes can be assigned to the pixels to be processed, that is, a color of the false eyelashes is assigned to the pixels to be processed.

In other embodiments, when the target processing is to adjust a size of a specific area, the performing target processing on the pixels to be processed to obtain a target image comprises: determining associated pixels of the pixels to be processed in the first image; and assigning pixel information corresponding to the associated pixels to the pixels to be processed to obtain the target image.

The adjusting a size of a specific area can be zooming-out or zooming-in processing on the size of the specific area where a certain part of the target object is located, for example, a size of an area where a face or leg part is located can be subjected to zooming-out processing to achieve a beautification effect of sliming. When the target processing is to adjust the size of the specific area, the image processing apparatus performs the processing in pixel units, and at this time, for each pixel to be processed, it is needed to determine first its associated pixel, the associated pixel can be a processed pixel, and then pixel information of the associated pixel can be assigned to the pixel to be processed, such that the adjusting of the size of the specific area can be achieved to obtain the target image.

Exemplarily, assuming that target processing is to zoom out the size of the area of the leg part of the target object, for one second pixel coordinate in a second image, it can be determined whether the processing on the second pixel is needed based on its location relation with a corresponding key point, and if the processing is needed, a pixel located at a first pixel coordinate in the first image that corresponds to the second pixel coordinate is determined as the pixel to be processed; an associated pixel coordinate of the second pixel coordinate is determined, and a pixel located at the first pixel coordinate in the first image that corresponds to the associated pixel coordinate is determined as an associated pixel, and pixel information of the associated pixel is assigned to the pixel to be processed, so that the zooming-out of the size of the leg part, namely leg sliming, can be achieved. For another example: assuming that target processing is to zoom in a size of an area of an eye of the target object, the processing is similar to the above example, except for an opposite purpose for determining the associated pixel, and at this time, pixel information of the associated pixel is assigned to the pixel to be processed, so that the zooming-in of the eye can be achieved.

The image processing solution provided by some embodiments of the present disclosure is: acquiring an original image to be processed, wherein the original image comprises at least one of a panoramic image, a semi-panoramic image, or a fisheye image; in response to a target processing request for the original image, determining a target detection box in the original image; performing distortion correction processing on a first image corresponding to the target detection box in the original image to obtain a second image; and determining the pixels to be processed in the first image based on the second image, and performing target processing on the pixels to be processed to obtain a target image. By using the above technical solution, for all distorted images including a common image and the above image with a larger field angle (comprising at least one of the panoramic image, the semi-panoramic image, or the fisheye image), the processing effect of the image, such as the beautification processing effect for the target object in the image, can be ensured. Moreover, for the above image with a larger field angle, after the distortion correction is performed on the area image corresponding to the detection box in the image, the pixels to be processed of the image before the distortion correction is determined based on the image after the distortion correction and is subjected to the target processing, to achieve the target processing on the original image. Since the part to be processed in the original image is determined based on the undistorted image, the pixels that must be remapped back to the original image in the processing is only the pixels to be processed, and there is no need to re-distort the whole image after the distortion correction, which avoids the problem of degraded image definition due to sampling multiple times during the process of re-distortion, thereby ensuring high definition of the image and improving the processing effect of the image. Meanwhile, according to the image processing solution provided by some embodiments of the present disclosure, the distortion correction and the target processing are combined together, the target processing is performed in the undistorted image coordinate space and directly acts on the original image, which increases the image processing speed, avoids the problem of a long time spent on the process of re-distortion after the distortion correction on the original image, effectively improves the efficiency of the image processing, and particularly for image processing for a high-resolution video, for example, for image processing for a VR video, image definition can be ensured and a real-time requirement of the video can also be met.

In some embodiments, in case that the original image is one image frame in a video, the determining a target detection box in the original image can comprise: acquiring an initial detection box of one previous image of the original image; and enlarging the initial detection box by a preset multiple to obtain the target detection box.

At this time, the object subjected to the image processing is an image sequence composed of a plurality of frames of images, which can be, for example, a video. The original image can be one certain image frame in the image sequence, and the one previous image can be an image frame in the image sequence that is located at one previous time moment of a time moment at which the original image is. In some embodiments of the present disclosure, when the target detection box of the original image is determined, it can also be determined based on the initial detection box of the one previous image. Specifically, a size of the initial detection box can be enlarged by a preset multiple to obtain the target detection box, and at the time of enlargement, the enlargement may take a center or one boundary of the initial detection box as a reference, which is not specifically limited. The initial detection box can be a detection box corresponding to the one previous image. The preset multiple can be determined according to an actual situation, for example, the preset multiple can be 2.

Figure 3:
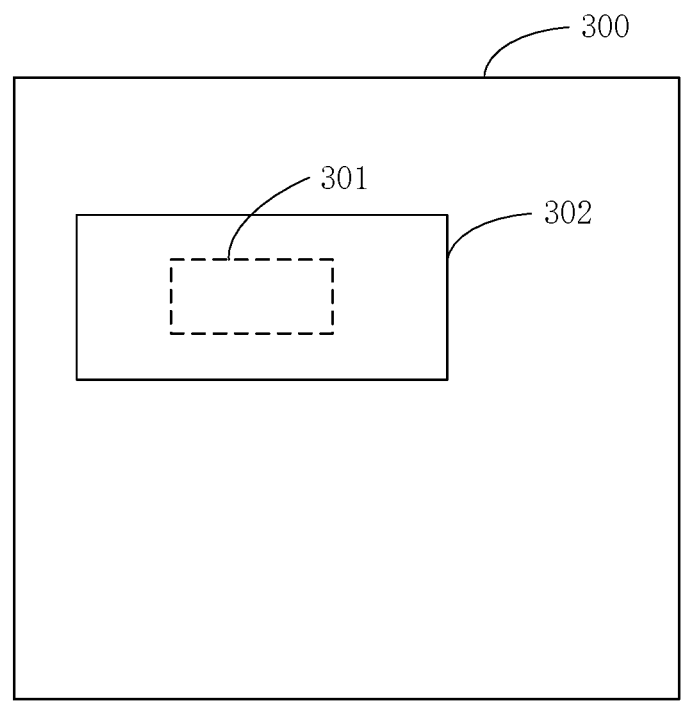
FIG. 3 is a schematic diagram of a detection box according to some embodiments of the present disclosure.

Exemplarily, FIG. 3 is a schematic diagram of a target detection box according to some embodiments of the present disclosure, and FIG. 3 presents one original image 300, which comprises an initial detection box 301 of one previous image, and assuming that the preset multiple is 2, by enlarging the initial detection box 301 by two times with its center as a reference, a target detection box 302 in the figure can be obtained, which is only an example, rather than a limitation.

In some embodiments, the preset multiple can be proportional to a moving speed of the target object. The moving speed of the target object can be determined by calculating moving distance and time of one pixel corresponding to the target object in several image frames previous to the original image in the video. The greater the moving speed of the target object is, the greater the preset multiple can be.

In some embodiments, in case that the original image is an image frame in the video, predicted positions of four vertices of a predicted detection box can also be determined according to the moving speed of the target object to obtain the predicted detection box, and the predicted detection box is enlarged by the preset multiple to obtain the target detection box.

In the above solution, when the original image is the image frame in the video, the target detection box can be determined by directly using the detection box of the one previous image of the original image, and considering that the location of the target object in the original image may be offset from the one previous image, the detection box of the one previous image needs to be enlarged to ensure that the part to be processed of the target object in the original image is located within the target detection box; and the enlargement multiple can be dynamically adjusted according to the moving speed of the target object, which further improves the accuracy of determining the detection box.

In some embodiments, after performing distortion correction processing on the first image corresponding to the target detection box in the original image to obtain the second image, the image processing method can further comprise: performing key point detection on the second image to obtain key point information; and optimizing the target detection box based on the key point information.

The key point information can comprise coordinates of a plurality of key points of the part of the target object comprised in the second image. The image processing apparatus can, after obtaining the second image, perform real-time key point detection on the second image by using a preset key point detection algorithm to obtain the key point information, wherein the preset key point detection algorithm can be determined according to an actual situation, for example, a preset key point detection algorithm can include an active appearance model (AAM) algorithm or another deep learning algorithm, which is not specifically limited. Then, a minimum enclosing rectangle of the part to be processed of the target object can be determined based on the coordinates of the key points in the key point information, and the minimum enclosing rectangle is determined as the optimized target detection box, and the optimized target detection box can be used as an initial detection box when the target processing is performed on a next image, so that a target detection box of the next image can be determined based on the initial detection box.

In the above solution, the key point detection is performed based on the image after the distortion correction processing that corresponds to the target detection box, which ensures the accuracy of the key point detection, and when the image to be processed is the image frame in the video, by using time continuity of the video, based on a detection box determined in one image frame, a detection box of its subsequent another image frame can be determined, which can, compared with the manner of determining a detection box in real time for each image frame, effectively improve the efficiency of the determining of the detection box, thereby improving the overall efficiency of subsequent image processing; and the location of the detection box is continuously optimized through the key point information, so that the accuracy of determining the detection box is ensured, thereby improving the accuracy of subsequent image processing.

Compared with the related art, the technical solution provided by some embodiments of the present disclosure has the following advantages: in the image processing solution provided by some embodiments of the present disclosure, acquiring an original image to be processed, wherein the original image comprises at least one of a panoramic image, a semi-panoramic image, or a fisheye image; in response to a target processing request for the original image, determining a target detection box in the original image; performing distortion correction processing on a first image corresponding to the target detection box in the original image to obtain a second image; and determining pixels to be processed in the first image based on the second image, and performing target processing on the pixels to be processed to obtain a target image. By using the technical solution, by performing distortion correction on the local area image corresponding to the detection box in the image, the pixels to be processed of the image before the distortion correction is determined based on the image after the distortion correction, and the target processing is performed on the pixels to be processed, thereby performing the target processing on the original image. Since the part to be processed in the original image is determined based on the undistorted image, the pixels that must be remapped back to the original image are only the pixels to be processed in the process, which avoids problems of a long time spent on the process of re-distortion after the distortion correction on the original image, and degraded image definition caused by sampling multiple times, effectively improves the efficiency of the image processing, and ensures high definition of the image and improves the processing effect of the image.

Figure 4:
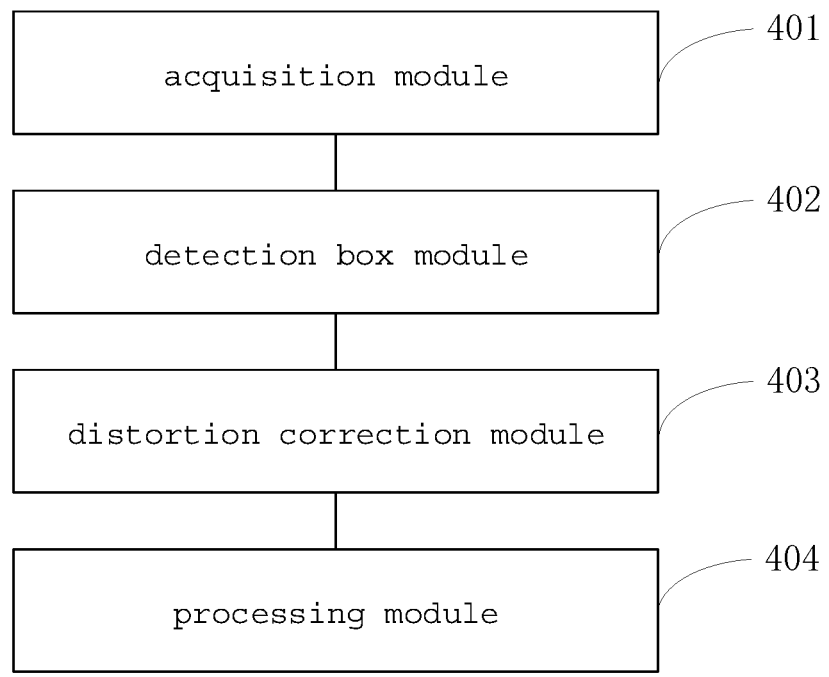
FIG. 4 is a schematic structural diagram of an image processing apparatus according to some embodiments of the present disclosure.

FIG. 4 is a schematic structural diagram of an image processing apparatus according to some embodiments of the present disclosure, wherein the apparatus can be implemented by software and/or hardware, and can be generally integrated in an electronic device. As shown in FIG. 4, the apparatus comprises:

an acquisition module 401 configured to acquire an original image to be processed, wherein the original image comprises at least one of a panoramic image, a semi-panoramic image, or a fisheye image; a detection box module 402 configured to determine, in response to a target processing request for the original image, a target detection box in the original image;

a distortion correction module 403 configured to perform distortion correction processing on a first image corresponding to the target detection box in the original image to obtain a second image; and a processing module 404 configured to determine pixels to be processed in the first image based on the second image, and perform target processing on the pixels to be processed to obtain a target image.

In some embodiments, in case that the original image is an image frame in a video, the detection block module 402 is configured to:
  acquire an initial detection box of one previous image of the original image; and
  enlarge the initial detection box by a preset multiple to obtain the target detection box.

In some embodiments, the preset multiple is proportional to a moving speed of the target object.

In some embodiments, the distortion correction module 403 is configured to:
  extract the first image corresponding to the target detection box in the original image, and perform distortion correction processing on the first image by using a multithread processing tool, to obtain the second image.

In some embodiments, the processing module 404 comprises a first unit configured to:
  determine a mapping relation between first pixel coordinates in the first image and second pixel coordinates in the second image, wherein each of the first pixel coordinates corresponds to one of the second pixel coordinates;
  determine a target pixel coordinates in the second image, and determine coordinates of the pixels to be processed in the first image that corresponds to the target pixel coordinates based on the mapping relation; and determine pixels in the first image that is located at coordinates of the pixels to be processed as the pixels to be processed.

In some embodiments, in case that the target processing is to add a special effect element, the processing module 404 comprises a second unit configured to:
  add attribute information of the special effect element to the pixels to be processed in the first image, to obtain the target image.

In some embodiments, in case that the target processing is to adjust a size of a specific area, the processing module 404 comprises a third unit configured to:
  determine associated pixels of the pixels to be processed in the first image; and
  assign pixel information corresponding to the associated pixels to the pixels to be processed, to obtain the target image.

In some embodiments, the apparatus further comprises an optimization module configured to: after performing distortion correction processing on the first image corresponding to the target detection box in the original image to obtain the second image,
  perform key point detection on the second image to obtain key point information; and
  optimize the target detection box based on the key point information.

The image processing apparatus provided by some embodiments of the present disclosure can perform the image processing method provided by any embodiment of the present disclosure, and has corresponding function modules and beneficial effects for performing the method.

The above modules can be implemented as software components executed on one or more general-purpose processors, or as hardware that performs certain functions or combinations thereof, such as a programmable logic device and/or application specific integrated circuit. In some embodiments, these modules can be embodied in the form of a software product, which can be stored in non-volatile storage media including instructions that cause a computer device (for example, a personal computer, server, network device, mobile terminal, etc.) to implement the method described in some embodiments of the present disclosure. In other embodiments, the above modules can be implemented on a single device or can be distributed on a plurality of devices. The functions of these modules can be combined with each other, or further divided into a plurality of sub-modules.

Some embodiments of the present disclosure further provides product, comprising a computer a computer program program/instructions which, when executed by a processor, implement the image processing method provided by any of the embodiments of the present disclosure.

Figure 5:
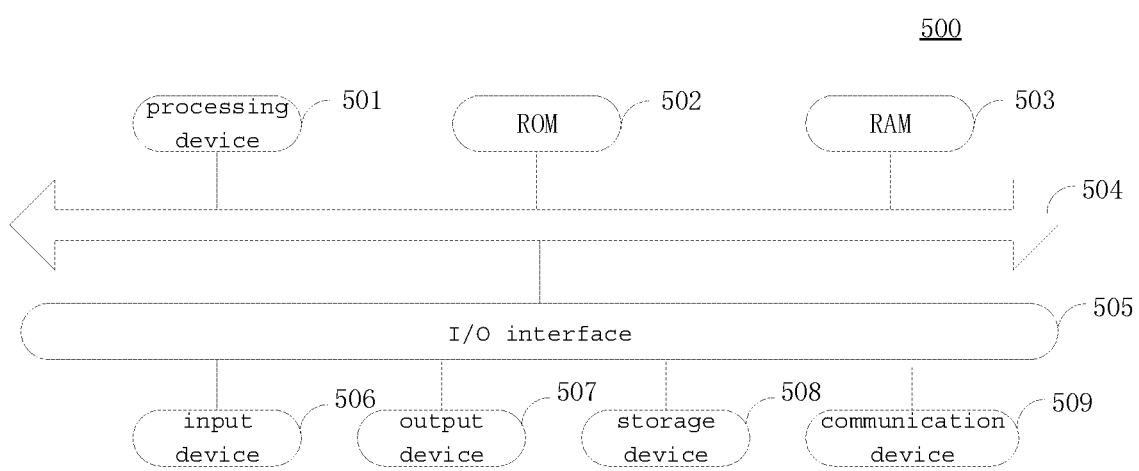
FIG. 5 is a schematic structural diagram of an electronic device according to some embodiment of the present disclosure.

FIG. 5 is a schematic structural diagram of an electronic device according to some embodiments of the present disclosure. Specific Reference is made below to FIG. 5, which shows a schematic structural diagram suitable for implementing an electronic device 500 in some embodiments of the present disclosure. The electronic device 500 in some embodiments of the present disclosure can include, but is not limited to, a mobile terminal such as a mobile phone, a notebook computer, a digital broadcast receiver, a PDA (Personal Digital Assistant), a PAD (tablet computer), a PMP (Portable Multimedia Player), a vehicle-mounted terminal (for example, a vehicle-mounted navigation terminal), and the like, and a fixed terminal such as a digital TV, a desktop computer, and the like. The electronic device shown in FIG. 5 is merely an example, and should not bring any limitation to the function and the scope of use of some embodiments of the present disclosure.

As shown in FIG. 5, the electronic device 500 can comprise a processing device (for example, a central processing unit, a graphics processing unit, etc.) 501 that can perform various appropriate actions and processes according to a program stored in a read-only memory (ROM) 502 or a program loaded from a storage device 508 into a random access memory (RAM) 503. In the RAM 503, various programs and data required for the operation of the electronic device 500 are also stored. The processing device 501, the ROM 502, and the RAM 503 are connected to each other through a bus 504. An input/output (I/O) interface 505 is also connected to the bus 504.

Generally, the following devices can be connected to the I/O interface 505: an input device 506 including, for example, touch screen, touch pad, keyboard, mouse, camera, microphone, accelerometer, gyroscope, etc.; an output device 507 including, for example, liquid crystal display (LCD), speaker, vibrator, and the like; the storage device 508 including, for example, magnetic tape, hard disk, etc.; and a communication device 509. The communication device 509 can allow the electronic device 500 to perform wireless or wired communication with another device to exchange data. While FIG. 5 illustrates the electronic device 500 having various devices, it should be understood that not all illustrated devices are required to be implemented or provided. More or fewer devices can be alternatively implemented or provided.

In particular, according to some embodiments of the present disclosure, the process described above with reference to the flow diagram can be implemented as a computer software program. For example, some embodiments of the present disclosure comprises a computer program product, which comprises a computer program carried on a non-transitory computer-readable medium, the computer program containing program code for performing the method illustrated by the flow diagram. In some embodiments, the computer program can be downloaded and installed from a network via the communication device 509, or installed from the storage device 508, or installed from the ROM 502. When executed by the processing device 501, the computer program performs the above functions defined in the image processing method of some embodiments of the present disclosure.

It should be noted that the above computer-readable medium of the present disclosure can be a computer-readable signal medium, or a computer-readable storage medium, or any combination of the above two. The non-transitory computer-readable storage medium can be, but not limited to, for example, an electronic, magnetic, optical, electromagnetic, infrared, or semiconductor system, apparatus, or device, or any combination of the above. More specific examples of the computer-readable storage medium can include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the computer-readable storage medium can be any tangible medium containing or storing a program, wherein the program can be used by or in combination with an instruction execution system, apparatus, or device. However, in the present disclosure, the computer-readable signal medium can include a data signal propagated in baseband or as part of a carrier wave, in which computer-readable program code is carried. Such a propagated data signal can take a variety of forms, including, but not limited to, an electromagnetic signal, an optical signal, or any suitable combination of the above. The computer-readable signal medium can be any computer-readable medium other than the computer-readable storage medium, which can send, propagate, or transmit a program for use by or in combination with an instruction execution system, apparatus, or device. The program code contained on the computer-readable medium can be transmitted using any appropriate medium, including but not limited to: wire, optical cable, RF (radio frequency), etc., or any suitable combination of the above.

In some embodiments, a client and a server can communicate using any currently known or future developed network protocol, such as HTTP (HyperText Transfer Protocol), and can be interconnected with any form or medium of digital data communication (for example, a communication network). Examples of the communication network include a local area network ("LAN"), a wide area network ("WAN"), an internet (for example, the Internet), and a peer-to-peer network (for example, an ad hoc peer-to-peer network), as well as any currently known or future developed network.

The above computer-readable medium can be contained in the above electronic device; or can be separate and not assembled into the electronic device.

The above computer-readable medium has thereon carried one or more programs, wherein the above one or more programs, when executed by the electronic device, cause the electronic device to: acquire an original image to be processed, wherein the original image comprises at least one of a panoramic image, a semi-panoramic image, or a fisheye image; in response to a target processing request for the original image, determine a target detection box in the original image; perform distortion correction processing on a first image corresponding to the target detection box in the original image to obtain a second image; and determine pixels to be processed in the first image based on the second image, and perform target processing on the pixels to be processed to obtain a target image.

The computer program code for performing the operation of the present disclosure can be written in one or more programming languages or a combination thereof, wherein the above programming language includes but is not limited to an object-oriented programming language such as Java, Smalltalk, C++, and also includes a conventional procedural programming language, such as the "C" programming language or a similar programming language. The program code can be executed entirely on a user computer, partly on the user computer, as a stand-alone software package, partly on the user computer and partly on a remote computer, or entirely on the remote computer or server. In a scenario where a remote computer is involved, the remote computer can be connected to the user computer through any type of network, including a local area network (LAN) or a wide area network (WAN), or can be connected to an external computer (for example, connected through the Internet using an Internet service provider).

The flow diagrams and block diagrams in the accompanying drawings illustrate the possibly implemented architectures, functions, and operations of systems, methods and computer program products according to various embodiments of the present disclosure. In this regard, each block in the flow diagram or block diagram can represent one module, program segment, or portion of code, which comprises one or more executable instructions for implementing the specified logic function. It should also be noted that, in some alternative implementations, functions noted in blocks can occur in a different order from those noted in the drawings. For example, two blocks shown in succession can, in fact, be executed substantially concurrently, and they can sometimes be executed in a reverse order, which depends upon the functions involved. It will also be noted that each block in the block diagram and/or flow diagram, as well as a combination of blocks in the block diagram and/or flow diagram, can be implemented with a special-purpose hardware-based system that performs the specified function or operation, or can be implemented with a combination of special-purpose hardware and computer instructions.

The involved unit described in some embodiments of the present disclosure can be implemented by software or hardware. The name of the unit, in some cases, does not constitute a limitation on the unit itself.

The function described above herein can be performed, at least partially, by one or more hardware logic components. For example, without limitation, exemplary types of the hardware logic component that can be used include: a field programmable gate array (FPGA), application specific integrated circuit (ASIC), application specific standard product (ASSP), system on chip (SOC), complex programmable logic device (CPLD), and the like.

In the context of this disclosure, a machine-readable medium can be a tangible medium, which can contain or store a program for use by or in combination with an instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination of the above. More specific examples of the machine-readable storage medium can include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

It can be understood that, before the technical solutions disclosed in some embodiments of the present disclosure are used, the type, the use scope, the use scenario, etc. of the information involved in the present disclosure should be appropriately informed to a user according to the related laws and regulations and authorized by the user.

The above description is merely the preferred embodiments of the present disclosure and an explanation of the applied technical principles. It should be appreciated by those skilled in the art that the disclosure scope involved in the present disclosure is not limited to the technical solution formed by the specific combination of the above technical features, but also encompasses another technical solution formed by an arbitrary combination of the above technical features or equivalent features thereof without departing from the disclosure concept, for example, a technical solution formed by replacing the above features with technical features having functions similar to those disclosed (but not limited to) in the present disclosure.

Furthermore, while the operations are depicted in a specific order, this should not be understood as requiring that these operations be performed in the specific order shown or in a sequential order. Under certain circumstances, multi-tasking and parallel processing may be advantageous. Likewise, while several specific implementation details are included in the above discussion, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in terms specific to structural features and/or method logic actions, it should be understood that the subject matter defined in the attached claims is not necessarily limited to the specific features or actions described above. Conversely, the specific features and actions described above are only exemplary forms of implementing the claims.

What is claimed is:

1. An image processing method, comprising:
   acquiring an original image to be processed, wherein the original image comprises at least one of a panoramic image, a semi-panoramic image, or a fisheye image;
   in response to a target processing request for the original image, determining a target detection box in the original image;
   performing distortion correction processing on a first image corresponding to the target detection box in the original image to obtain a second image;

determining pixels to be processed in the first image based on the second image; and performing target processing on the pixels to be processed to obtain a target image, comprising at least one of:
  in case that the target processing is to add a special effect element, adding attribute information of the special effect element to the pixels to be processed in the first image to obtain the target image; or
  in case that the target processing is to adjust a size of a specific area, determining associated pixels of the pixels to be processed in the first image, and assigning pixel information corresponding to the associated pixels to the pixels to be processed to obtain the target image, wherein the determining a target detection box in the original image comprises:
  in case that the original image is one image frame in a video, determining predicted positions of four vertices of a predicted detection box according to a moving speed of the target object; and
  enlarging the predicted detection box by a preset multiple to obtain the target detection box.

2. The image processing method according to claim 1, wherein the determining a target detection box in the original image comprise:
  in case that the original image is one image frame in a video, acquiring an initial detection box of one previous image of the original image; and
  enlarging the initial detection box by a preset multiple to obtain the target detection box.

3. The image processing method according to claim 2, wherein the preset multiple is proportional to a moving speed of the target object.

4. The image processing method according to claim 3, wherein the determining a target detection box in the original image comprises:
  determining a moving speed of the target object according to moving distance and time of one pixel corresponding to the target object, in a plurality of images previous to the original image.

5. The image processing method according to claim 1, wherein the performing distortion correction processing on a first image corresponding to the target detection box in the original image to obtain a second image comprises:
  extracting the first image corresponding to the target detection box in the original image; and
  performing distortion correction processing on the first image by using a multithread processing tool to obtain the second image.

6. The image processing method according to claim 1, wherein the determining pixels to be processed in the first image based on the second image comprises:
  determining a mapping relation between first pixel coordinates in the first image and second pixel coordinates in the second image, each of the first pixel coordinates corresponding to one of the second pixel coordinates;
  determining target pixel coordinates in the second image;
  determining coordinates of the pixels to be processed in the first image that correspond to the target pixel coordinates based on the mapping relation; and
  determining pixels located at the coordinates of the pixels to be processed in the first image as the pixels to be processed.

7. The image processing method according to claim 1, further comprising:
  after performing distortion correction processing on the first image corresponding to the target detection box in the original image to obtain the second image, performing key point detection on the second image to obtain key point information; and
  optimizing the target detection box based on the key point information.

8. The image processing method according to claim 7, wherein the key point information comprises coordinates of a plurality of key points of a part to be processed of the target object in the second image, and the optimizing the target detection box based on the key point information comprises:
  determining a minimum enclosing rectangle of the part to be processed of the target object according to the coordinates of the plurality of key points; and
  determining an optimized target detection box according to the minimum enclosing rectangle.

9. The image processing method according to claim 1, wherein the determining a target detection box in the original image comprises:
  in case that the original image is one image frame in a video, determining the target detection box of the original image according to an initial detection box of one previous image of the original image.

10. An electronic device, comprising:
  a processor, and
  a memory for storing executable instructions for the processor,
  wherein the processor is configured to read the executable instructions from the memory and execute the instructions to implement an image processing method comprising:
  acquiring an original image to be processed, wherein the original image comprises at least one of a panoramic image, a semi-panoramic image, or a fisheye image;
  in response to a target processing request for the original image, determining a target detection box in the original image;
  performing distortion correction processing on a first image corresponding to the target detection box in the original image to obtain a second image;
  determining pixels to be processed in the first image based on the second image; and
  performing target processing on the pixels to be processed to obtain a target image,
  wherein the performing the target processing on the pixels to be processed to obtain the target image, comprising at least one of:
    in case that the target processing is to add a special effect element, adding attribute information of the special effect element to the pixels to be processed in the first image to obtain the target image; or
    in case that the target processing is to adjust a size of a specific area, determining associated pixels of the pixels to be processed in the first image, and assigning pixel information corresponding to the associated pixels to the pixels to be processed to obtain the target image,
  wherein the processor is configured to:
  in case that the original image is one image frame in a video, acquire an initial detection box of one previous image of the original image; and
  enlarge the initial detection box by a preset multiple to obtain the target detection box,
  wherein the preset multiple is proportional to a moving speed of the target object.

11. The electronic device according to claim 10, wherein the processor is configured to:

extract the first image corresponding to the target detection box in the original image; and perform distortion correction processing on the first image by using a multithread processing tool to obtain the second image.

12. A non-transitory computer-readable storage medium having thereon stored a computer program, which when executed by a processor, implements an image processing method comprising:

acquiring an original image to be processed, wherein the original image comprises at least one of a panoramic image, a semi-panoramic image, or a fisheye image;

in response to a target processing request for the original image, determining a target detection box in the original image;

performing distortion correction processing on a first image corresponding to the target detection box in the original image to obtain a second image;

determining pixels to be processed in the first image based on the second image;

performing target processing on the pixels to be processed to obtain a target image, wherein the performing the target processing on the pixels to be processed to obtain the target image, comprising at least one of:

in case that the target processing is to add a special effect element, adding attribute information of the special effect element to the pixels to be processed in the first image to obtain the target image; or in case that the target processing is to adjust a size of a specific area, determining associated pixels of the pixels to be processed in the first image, and assigning pixel information corresponding to the associated pixels to the pixels to be processed to obtain the target image, in case that the original image is one image frame in a video, acquiring an initial detection box of one previous image of the original image; and enlarging the initial detection box by a preset multiple to obtain the target detection box, wherein the preset multiple is proportional to a moving speed of the target object.

13. The non-transitory computer-readable storage medium according to claim 12, wherein the image processing method further comprising:

extracting the first image corresponding to the target detection box in the original image; and performing distortion correction processing on the first image by using a multithread processing tool to obtain the second image.

* * * * *